(12) United States Patent
Fujii et al.

(10) Patent No.: US 11,609,166 B2
(45) Date of Patent: Mar. 21, 2023

(54) DEFORMATION LIMIT EVALUATION METHOD FOR SHEARED SURFACE OF METAL SHEET, CRACK PREDICTION METHOD, AND PRESS DIE DESIGNING METHOD

(71) Applicant: JFE Steel Corporation, Tokyo (JP)

(72) Inventors: Yusuke Fujii, Tokyo (JP); Kento Fujii, Tokyo (JP); Yuji Yamasaki, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 555 days.

(21) Appl. No.: 16/640,224

(22) PCT Filed: Jul. 13, 2018

(86) PCT No.: PCT/JP2018/026587
§ 371 (c)(1),
(2) Date: Feb. 19, 2020

(87) PCT Pub. No.: WO2019/039134
PCT Pub. Date: Feb. 28, 2019

(65) Prior Publication Data
US 2020/0292429 A1    Sep. 17, 2020

(30) Foreign Application Priority Data

Aug. 23, 2017  (JP) .............................. JP2017-160055

(51) Int. Cl.
*G01N 3/28* (2006.01)
*G06F 30/23* (2020.01)
(Continued)

(52) U.S. Cl.
CPC ............... *G01N 3/28* (2013.01); *B21D 5/004* (2013.01); *G06F 30/17* (2020.01); *G06F 30/23* (2020.01); *G01N 2203/0062* (2013.01)

(58) Field of Classification Search
CPC .. G01N 3/28; G01N 2203/0062; G06F 30/23; G06F 30/17; B21D 5/004
See application file for complete search history.

(56) References Cited

U.S. PATENT DOCUMENTS

| 8,990,028 B2 | 3/2015 | Yonemura et al. |
| 9,333,549 B2 | 5/2016 | Fujii et al. |

(Continued)

FOREIGN PATENT DOCUMENTS

| CN | 101379381 A | 3/2009 |
| CN | 104010745 A | 8/2014 |

(Continued)

OTHER PUBLICATIONS

Morales-Palma D, Vallellano C, García-Lomas FJ. Assessment of the effect of the through-thickness strain/stress gradient on the formability of stretch-bend metal sheets. Materials & Design. Sep. 1, 2013;50:798-809. (Year: 2013).*

(Continued)

Primary Examiner — Chuen-Meei Gan
(74) Attorney, Agent, or Firm — RatnerPrestia

(57) ABSTRACT

There are provided an evaluation method and a prediction method for a technology to be reflected in a press die designing method. A deformation limit evaluation method includes evaluating the deformation limit on a sheared surface of a metal sheet in press-forming the sheared metal sheet. The deformation limit is evaluated and a crack in the sheared surface is predicted based on the relationship between an index value determined from two surface strain distribution gradients of a surface strain distribution gradient in a sheet thickness direction in the sheared surface and a surface strain distribution gradient in a bending ridge line direction by bending in a direction away from the sheared surface at an evaluation position among distributions of strains generated near the boundary between a bending (Continued)

outside surface and the sheared surface of the metal sheet to be bent and a tension generated in the sheared surface.

10 Claims, 5 Drawing Sheets

(51) Int. Cl.
*G06F 30/17* (2020.01)
*B21D 5/00* (2006.01)

(56) References Cited

U.S. PATENT DOCUMENTS

| | | | |
|---|---|---|---|
| 9,874,504 B2 | 1/2018 | Yonemura et al. | |
| 9,953,115 B2 | 4/2018 | Sonobe et al. | |
| 10,352,836 B2 | 7/2019 | Shirakami et al. | |
| 2013/0283875 A1* | 10/2013 | Jin | B21D 5/02 72/17.3 |
| 2015/0231682 A1* | 8/2015 | Fujii | B21D 37/20 72/352 |
| 2015/0294043 A1 | 10/2015 | Sonobe et al. | |
| 2016/0161382 A1* | 6/2016 | Yonemura | G06F 30/20 73/851 |
| 2017/0191915 A1 | 7/2017 | Shirakami et al. | |

FOREIGN PATENT DOCUMENTS

| | | | |
|---|---|---|---|
| CN | 104813156 A | | 7/2015 |
| CN | 105283874 A | | 1/2016 |
| CN | 106018129 A | | 10/2016 |
| EP | 3165298 A1 | | 5/2017 |
| JP | 2009204427 A | | 9/2009 |
| JP | 2010069533 A | | 4/2010 |
| JP | 2011043452 A | | 3/2011 |
| JP | 2014-16807 A | * | 7/2012 |
| JP | 5146395 B2 | | 2/2013 |
| JP | 5294082 B2 | | 9/2013 |
| JP | 2014016807 A | | 1/2014 |
| JP | 2014115269 A | | 6/2014 |
| JP | 5630312 B2 | | 11/2014 |
| KR | 20160138275 A | | 12/2016 |

OTHER PUBLICATIONS

Gorji M, Berisha B, Hora P, Barlat F. Modeling of localization and fracture phenomena in strain and stress space for sheet metal forming. International Journal of Material Forming. Nov. 2016;9(5):573-84. (Year: 2016).*

"Analysis of Camber Deformation Occurring at the Edge of Sheet-metal Bending" edited by Koichi Kazama et al., vol. 45, No. 516, 2004, pp. 40-44.

International Search Report and Written Opinion for International Application No. PCT/JP2018/026587, dated Sep. 18, 2018, 4 pages.

International Preliminary Report on Patentability and Written Opinion for International Application No. PCT/JP2018/026587, dated Feb. 25, 2020, 6 pages.

European Communication pursuant to Article 94(3) for European Application No. 18 849 137.7, dated Nov. 12, 2021, 6 pages.

Chinese Office Action with Search Report for Chinese Application No. 201880054714.7, dated Dec. 30, 2020, 10 pages.

Morales-Palma et al., "Assessment of the Effect of the Through-Thickness Strain/Stress Gradient on the Formability of Stretch-Bend Metal Sheets", Materials and Design, 2013, vol. 50, pp. 798-809.

Extended European Search Report for European Application No. 18849137.7, dated Jul. 29, 2020, 7 pages.

Korean Office Action for Korean Application No. 10-2020-7004923, dated Apr. 15, 2021, with Concise Statement of Relevance of Office Action, 18 pages.

* cited by examiner

DEFORMATION LIMIT EVALUATION METHOD FOR SHEARED SURFACE OF METAL SHEET, CRACK PREDICTION METHOD, AND PRESS DIE DESIGNING METHOD

CROSS REFERENCE TO RELATED APPLICATIONS

This is the U. S. National Phase application of PCT/JP2018/026587, filed Jul. 13, 2018, which claims priority to Japanese Patent No. 2017-160055, filed Aug. 23, 2017, the disclosures of these applications being incorporated herein by reference in their entireties for all purposes.

FIELD OF THE INVENTION

The present invention is a technology of evaluating and predicting a crack generated in a sheared surface (end surface) when a metal sheet (raw material) after shearing is formed and processed by press forming including bending and a technology relating to a die shape designing method (determination method) capable of suppressing a crack in a metal sheet based on the technology.

BACKGROUND OF THE INVENTION

The press forming is one of typical metal processing technologies and is a technology of processing a metal sheet into a desired product shape by holding the metal sheet between a pair of dies for pressing, and then forming the metal sheet to follow the die shape. The press forming is used in a wide range of manufacturing fields, such as automobile parts, machine parts, building members, and home appliances.

As one of main problems of the formability in the press forming, cracks are mentioned. The cracks mainly include a crack due to tensile deformation of a raw material, a crack due to bending deformation, and a crack due to combined deformation thereof. The crack due to the tensile deformation is mainly due to the ductility of the raw material and is commonly evaluated by a crack prediction technique using a forming limit diagram. On the other hand, the crack due to the bending deformation is mainly due to bendability R/t which is a ratio of a bending radius R of the die and a sheet thickness t of the raw material. It is common to predict the crack by experimentally determining a ratio of the minimum bending radius such that no splits are generated in the surface of the raw material and the sheet thickness t. As a method for predicting the crack due to the combined deformation of the tensile deformation and the bending deformation, a prediction technique using the bending radius R of the die and a tension generated in the metal sheet is mentioned, for example (PTL 1).

The above-described cracks are all cases where the split is generated from the surface of the metal sheet, and then the split penetrates in the sheet thickness direction.

However, in addition thereto, a case is mentioned as the case of the generation of a crack in which the end surface of a sheared raw material is deformed, whereby a split is generated from the end surface and results in a crack. The end surface of the raw material has features that the ductility is poor because the end surface is greatly deformed by the shearing and that a split is likely to be generated because stress concentrates on a fracture surface or irregularities, such as a burr. Therefore, methods for evaluating and predicting the crack are different from the methods above.

Conventionally, with respect to the crack in the end surface of the raw material, a method for evaluating a stretch flange crack due to the tensile deformation has been examined in many ways. For example, a prediction technique using a strain gradient in a direction along the end surface and a strain distribution gradient in the in-plane direction orthogonal to the end surface (PTL 2) and the like are proposed. The strain distribution gradient as used herein (which is also referred to as "strain gradient" in this specification) is a change in the strain per unit length of the strain distributed in a certain length. However, there are few effective prediction methods and evaluation methods for the crack in the end surface of the raw material due to the bending deformation or the combined deformation of the tensile deformation and the bending deformation. However, such a crack in the end surface of the raw material begins to become apparent as a problem particularly in a high strength steel sheet having tensile strength of 590 MPa grade or more.

PATENT LITERATURES

PTL 1: Japanese Patent No. 5630312
PTL 2: Japanese Patent No. 5146395

Non Patent Literature

NPL 1: "Analysis of Camber Deformation Occurring at the Edge of Sheet-metal Bending" edited by Koichi Kazama and Yasutomo NAGAI, Vol. 45, No. 516, 2004, pp. 40 to 44

SUMMARY OF THE INVENTION

Aspects of the present invention have been made focusing on the above-described respects. It is an object according to aspects of the present invention to provide a technique of evaluating and predicting a crack due to bending deformation or combined deformation of tensile deformation and bending deformation in an end surface of a sheared raw material (metal sheet) and a technology to be reflected on a press die designing method.

In order to solve the problem, one aspect of the present invention is a deformation limit evaluation method evaluating the deformation limit on the sheared surface of a sheared metal sheet when the sheared metal sheet is formed by press forming including bending and the method includes evaluating the deformation limit on the sheared surface based on the relationship between an index value determined from two surface strain distribution gradients of a surface strain distribution gradient in the sheet thickness direction in the sheared surface and a surface strain distribution gradient in the bending ridge line direction by the bending at an evaluation position among distributions of stains generated near the boundary between the bending outside surface and the sheared surface of the metal sheet to be bent and a tension generated in the sheared surface.

One aspect of the present invention can evaluate the deformation limit of the end surface in deforming the target metal sheet (raw material) after shearing. As a result, one aspect of the present invention can accurately predict whether a crack from an end surface is generated and can design a die shape capable of suppressing the generation of a crack.

Moreover, one aspect of the present invention can evaluate a plurality of aspects of simple bending, combined deformation of bending and tension, and tensile deformation with one index.

BRIEF DESCRIPTION OF THE DRAWINGS

FIGS. 4A and 4B are schematic views illustrating an example of performing simple bending forming, in which FIG. 4A is a side surface view and FIG. 4B is a plan view illustrating the relationship between a test piece 1 and a punch 21;

FIGS. 5A and 5B are schematic views illustrating an example of performing combined bending forming, in which FIG. 5A is a side surface view and FIG. 5B is a plan view illustrating the relationship between the test piece 1 and a punch 32;

DETAILED DESCRIPTION OF EMBODIMENTS OF THE INVENTION

Embodiments of the present invention will now be described with reference to the drawings.

Figure 1:
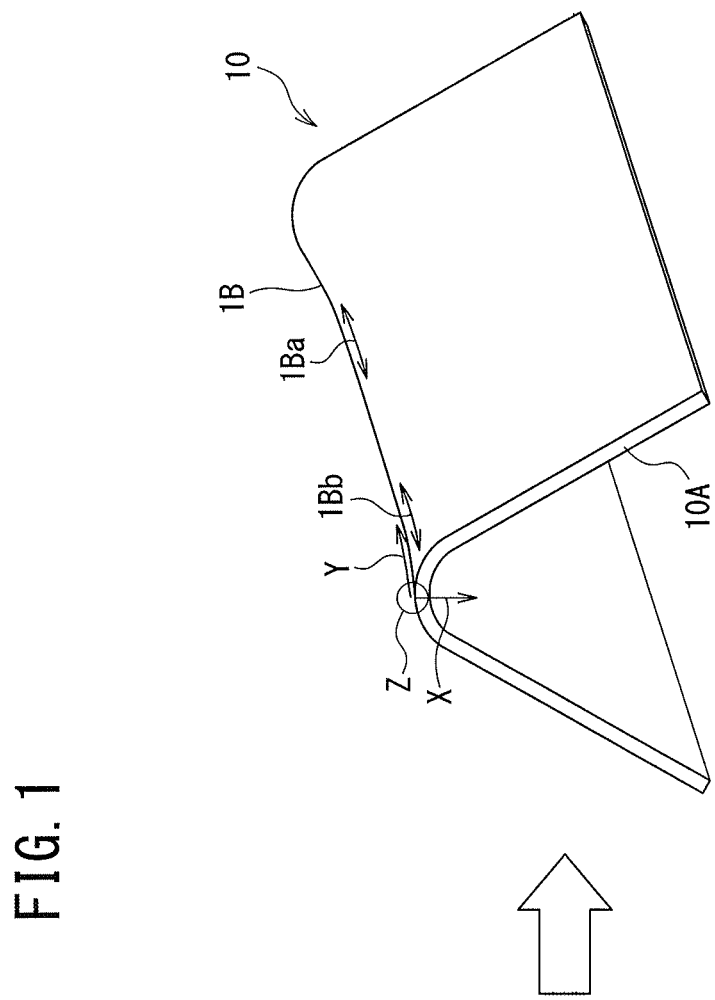
FIG. 1 is a view illustrating an example of a formed article formed by press forming including bending.

FIG. 1 illustrates an example of a formed article obtained by forming a metal sheet by press forming including bending. FIG. 1 illustrates an example of press-forming the metal sheet into a saddle shape. In FIG. 1, the reference numeral 1B designates a bending ridge line direction serving as a bending line position in bending a metal sheet 1. The reference numeral 10A designates an end surface (sheared surface). The reference numeral Z designates an example of a place where a split is likely to be generated in the vicinity of the boundary between the bending outside surface and the sheared surface.

Figure 2:
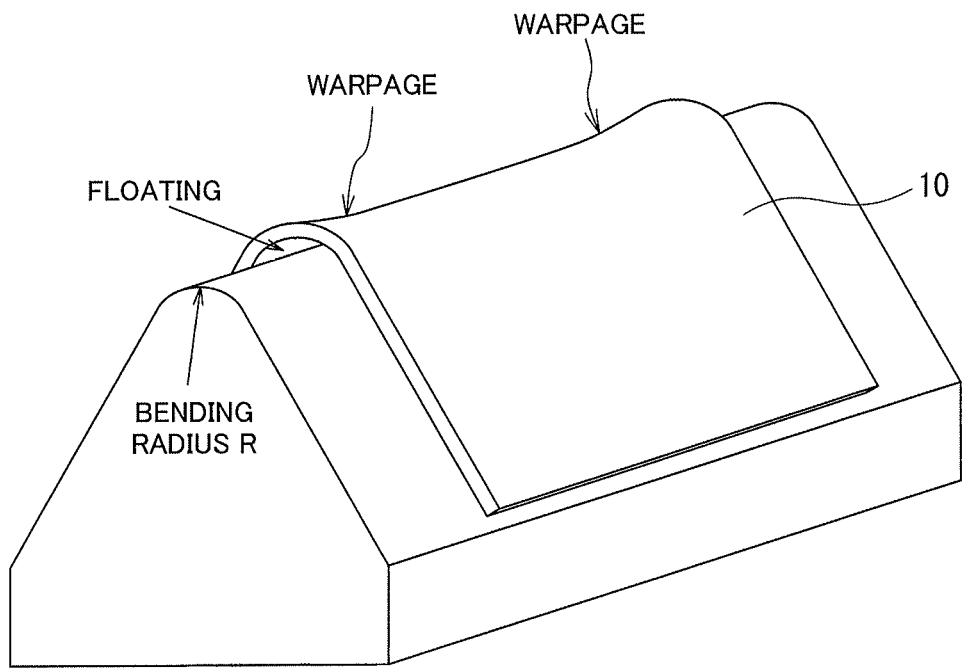
FIG. 2 is a view illustrating an example of a state where the floating from a die occurs in bending.

Then, as a result of various examinations by the present inventors, when the raw material 1 (metal sheet 1) is press-formed, warpage occurs in the end surface of the raw material 1 in the bending (for example, NPL 1), so that the end surface side of the raw material 1 floats from a bent portion of a die as illustrated in FIG. 2. Therefore, while the center portion side (see the reference numeral 1Ba of FIG. 1) of the raw material 1 is subjected to bending deformation with a bending radius close to a bending radius R of the die, the end surface side (see 1Bb of FIG. 1) of the raw material 1 is subjected to bending deformation with a bending radius different from the bending radius R of the die.

At this time, in the case of combined deformation of bending deformation and tensile deformation, the floating of the raw material end surface to the die tends to decrease when the tensile deformation is strengthened. However, when the strength of the raw material 1 is 590 MPa or more or the sheet thickness is 1.0 mm or more, a crack is generated before the floating in the end surface 10A of the raw material 1 is eliminated. Therefore, it has been found that the crack from the end surface 10A cannot be accurately predicted according to a crack prediction technique using the bending radius R of the die as in a conventional case.

Moreover, a very large strain gradient is generated in a sheet thickness direction X of the raw material 1 in the bending deformation. Therefore, the effect of a strain gradient in a direction along the end surface 10A of the raw material 1 or a strain gradient in the in-plane direction orthogonal to the end surface 10A becomes relatively small. Hence, it has been found that it is difficult to predict the crack in the end surface 10A in the case of the press forming including the bending deformation according to the conventional prediction technique using the same.

Furthermore, the present inventors have acquired the following knowledge as a result of applying various deformations to the end surface 10A of the sheared raw material 1 to examine whether a crack is generated.

A split from the end surface 10A progresses in a direction orthogonal to the direction of the maximum principal strain given to the split generation portion. In that case, when the strain gradient in the direction orthogonal to the direction of the maximum principal strain is larger, the generation and the progress of the split tend to be further suppressed. A value in the direction where the strain gradient is the maximum among various directions orthogonal to the direction of the maximum principal strain exhibits the highest prevention effect. However, the direction where the strain gradient is the maximum is not fixed due to the deformations applied to the end surface 10A of the raw material 1 and the warpage occurs in the end surface 10A of the raw material 1 in the bending deformation as described above, and therefore it is difficult to specify the direction where the strain gradient is the maximum.

The method of this embodiment provides a technology for enabling systematical and accurate evaluation of the evaluation of the deformation limit and the prediction of a crack in the sheared surface 10A (end surface 10A formed by the shearing) with one index value even in any case of simple bending deformation and a deformation in which the tensile deformation and the bending deformation are combined in the sheared surface 10A of the metal sheet 1 in pressing.

The present inventors have devised, based on the above-described knowledge, an evaluation method evaluating the deformation limit on the sheared surface 10A of the metal sheet 1 using two parameters of an index value determined from two surface strain distribution gradients of a surface strain distribution gradient in the sheet thickness direction X and a surface strain distribution gradient in a bending ridge line direction Y in a vicinity Z of the split generation portion and a tension generated in the sheared surface and an end surface crack prediction method based on the evaluation method.

(Index Value)

An index value is described which is used in the evaluation for evaluating the deformation limit and the prediction of the end surface crack based on the evaluation in the sheared surface 10A of the metal sheet 1 used in this embodiment.

The index value of this embodiment is a value having, as variables, the two surface strain distribution gradients of the surface strain distribution gradient in the sheet thickness direction X in the sheared surface 10A and the surface strain distribution gradient in the bending ridge line direction Y by the bending in a direction away from the sheared surface 10A among distributions of strains generating near the boundary between the bending outside surface and the sheared surface 10A of the metal sheet 1 to be bent. Herein, the bending outside surface is the surface on the side where the surface is deformed into a projection by the bending.

The index value is an average value of the two surface strain distribution gradients as in Expression (1) below, for example. In this example, $\Delta\varepsilon$combine is the index value. The strain gradient generally indicates the steepness of the strain.

Herein, the surface strain in the bending ridge line direction Y is a surface strain in the bending ridge line direction Y from the end surface 10A in the bending outside surface of the metal sheet 1 to be bent. The gradient thereof is a gradient in a direction away from the end surface 10A with the end surface 10A as the starting point. The surface strain distribution gradient in the sheet thickness direction X is a gradient toward the inner surface side from the bending outside surface.

$$\Delta\varepsilon\text{combine}=(\Delta\varepsilon\text{thickness}+\Delta\varepsilon\text{ridgeline})/2 \quad (1)$$

wherein, $\Delta\varepsilon$thickness is the surface strain distribution gradient in the sheet thickness direction X, and $\Delta\varepsilon$ridgeline is the surface strain distribution gradient in the bending ridge line direction Y.

The knowledge has been acquired that the split generated from the end surface 10A has a correlation with the gradients in the two directions of the surface strain distribution gradient in the sheet thickness direction X and the surface strain distribution gradient in the bending ridge line direction Y in the vicinity Z of the split generation portion. However, the index value $\Delta\varepsilon$combine obtained from a root mean square of the gradients in the two directions has a higher correlation with the split in the end surface 10A as in Expression (2). Therefore, by the use of an evaluation value calculated by Expression (2), the evaluation of the deformation limit and the prediction of the end surface crack in the sheared surface 10A can be performed with higher accuracy.

$$\Delta\varepsilon\text{combine}=0.5\times((\Delta\varepsilon\text{thickness})^2+(\Delta\varepsilon\text{ridgeline})^2)^{0.5} \quad (2)$$

wherein, $\Delta\varepsilon$thickness is the surface strain distribution gradient in the sheet thickness direction X, and $\Delta\varepsilon$ridgeline is the surface strain distribution gradient in the bending ridge line direction Y.

The evaluation of the deformation limit and the prediction of the end surface crack in the end surface 10A using the index value of this embodiment also has advantages that the evaluation and the prediction can be performed with one index value to a plurality of bending deformations and a value of the maximum strain gradient is calculated by a simple method without specifying the direction where the strain gradient is the maximum. Moreover, the index value of this embodiment is applicable also to a crack due to simple tensile deformation.

As a simple evaluation technique, it may be evaluated whether the crack from the end surface 10A is generated by calculating the index value only from the gradient $\Delta\varepsilon$thickness of the surface strain distribution in the sheet thickness direction X as in Expression (3). More specifically, $$\Delta\varepsilon\text{combine}=\Delta\varepsilon\text{thickness} \quad (3)$$

may be acceptable.

This is because the contribution of the value of the surface strain distribution gradient in the sheet thickness direction X is higher than the contribution of the value of the surface strain distribution gradient in the bending ridge line direction Y in the bending as the crack evaluation index. Therefore, Expression (3) has an advantage of being simpler although the accuracy decreases.

Moreover, as another simple method, a sum of the two surface strain distribution gradients in the sheet thickness direction X and in the bending ridge line direction Y may be used as the index value as in Expression (4).

$$\Delta\varepsilon\text{combine}=\Delta\varepsilon\text{thickness}+\Delta\varepsilon\text{ridgeline} \quad (4)$$

Herein, Expression (1) above is an example when, in determining the index value from the two surface strain distribution gradients, equalizing the two surface strain distribution gradients by an arithmetic average. From the viewpoint that the surface strain distribution gradient in the sheet thickness direction X has a higher contribution in the bending, the weighting on the side of the surface strain distribution gradient in the sheet thickness direction X may be increased, and then the index value may be determined by a weighted average as in Expression (5).

$$\Delta\varepsilon\text{combine}=(a\times\Delta\varepsilon\text{thickness}+b\times\Delta\varepsilon\text{ridgeline}) \quad (5)$$

wherein, a, b are weighting factors and are set to establish the relationship of a>b. For example, a=0.7 and b=0.3 are set.

Similarly, also in Expression (2) and Expression (4), the weighting on the side of the surface strain distribution gradient in the sheet thickness direction X may be set to be large.

For example, as in Expression (4), when the sum of the two surface strain distribution gradients is set to the index value, the weighting on the side of the surface strain distribution gradient in the sheet thickness direction X may be set to be large as in Expression (6).

$$\Delta\varepsilon\text{combine}=a\cdot\Delta\varepsilon\text{thickness}+b\cdot\Delta\varepsilon\text{ridgeline} \quad (6)$$

wherein, a, b are weighting factors and are set to establish the relationship of a>b. For example, a=1.3 and b=0.7 are set.

(Normalization of Evaluation Value)

Furthermore, $\Delta\varepsilon$combine which is the above-described index value may be normalized by a reciprocal of the local elongation of the metal sheet 1.

For example, the local elongation L-El of the raw material 1 is used, and then the index value is multiplied by the reciprocal of the local elongation L-El of the metal sheet 1 to normalize the index value as in Expression (7).

$$\Delta\varepsilon\text{combine}\leftarrow\Delta\varepsilon\text{combine}/\text{L-El} \quad (7)$$

Herein, the local elongation L-El is determined by performing a tensile test of the raw material 1 with a predetermined shape (for example, rectangular flat sheet). Specifically, the local elongation L-El is determined from a difference between the elongation until the fracture of the raw material 1 (total elongation) and the elongation in which the tensile strength is the maximum (uniform elongation). In many raw materials 1, the uniform elongation and the local elongation L-El are equal to each other. Therefore, values of the uniform elongation and the half of the total elongation may be adopted in place of the local elongation L-El. In addition thereto, there are methods for determining the local elongation L-El of the raw material 1 but the method is not particularly limited.

(Tension Generated in Sheared Surface)

The tension generated in the sheared surface is force per unit area (hereinafter simply referred to as a tension) in a direction parallel to the raw material surface along the sheared surface (end surface).

In a bent portion, a tensile stress and a compression stress are generated in the bending outside and the bending inside, respectively, rather than the center in the sheet thickness by bending deformation, and therefore it is difficult to separate the stress generated by the bending deformation and the tension generated in parallel along the end surface. Thus, it is preferable to use a stress in the center in the sheet thickness of the bent portion or an average stress in the entire sheet thickness of the bent portion. For simplicity, a tension of the sheared end surface adjacent to the bent portion and not subjected to the bending deformation does not include the stress of the bending deformation, and therefore a stress in the center in the sheet thickness or an average value of stresses in the entire sheet thickness may be adopted.

For the calculation of the tension, it is simple to determine a tensile stress generated in a finite element of the corresponding portion by a forming simulation, and then use a value of the tensile stress as a tension for evaluation.

(Evaluation Position for Determining Index Value and Tension)

Herein, the evaluation position for determining the index value $\Delta\varepsilon$combine is preferably a position where the generation of a split is estimated in the deformation of the end surface 10A by bending using target press forming. For example, the position designated by the reference numeral Z in FIG. 1 is mentioned. In the sheared surface, a tension value and a strain gradient increase at the position designated by the reference numeral Z where the bending deformation is performed and a split is likely to first occur at the position.

The position where the generation of a split is estimated in the end surface deformation may be set as a position where the strain is the largest determined by an experiment or a forming simulation beforehand. For example, a position where a curvature change is the largest or the vicinity thereof in an end surface portion to be bent by bending is set as the evaluation position.

(End Surface by Shearing (Sheared Surface 10A))

The end surface 10A by after shearing is described.

The shearing is a method for applying a shearing deformation to the raw material 1 using a pair of punch and die to cause the generation of a crack to thereby divide the raw material 1 into two or more parts.

In this embodiment, the raw material 1 having the sheared surface 10A is produced by being sheared into a predetermined outline shape by common shearing.

Herein, the property of the end surface 10A of the sheared raw material 1 varies depending on the clearance which is the interval between the punch and the die but this embodiment is not limited to the property of the end surface 10A. However, from the viewpoint that a processing load is low and the punch and the die are hardly damaged, the clearance is preferably set in the range of 5 to 20% of the sheet thickness of the raw material 1 and preferably set to 8 to 15% particularly in a steel sheet having tensile strength of 590 MPa or more. There is also a method for creating the sheared surface 10A to be wide by performing the shearing by setting the clearance to 5% or less. This embodiment is applicable regardless of which method is used for producing a test piece (raw material 1) to be evaluated by performing shearing.

Then, various deformations are applied with the raw material 1 sheared into a predetermined outline shape as the test piece, and then the above-described tension and the above-described strain gradient for the index value are determined.

(Application of Simple Bending Deformation)

As a method for applying bending deformation to the end surface 10A of the sheared test piece, any method may be acceptable insofar as the bending radius R of a die, a jig, or the like bending the test piece 1 and the presence or absence of a split in the end surface 10A can be confirmed.

For simplicity, a method is preferable which confirms the presence or absence of a split by bending the end surface 10A of the test piece 1 while varying the tip radius R of a V-bending or U-bending punch. In addition thereto, bending methods, such as roll forming, are mentioned.

(Application of Combined Deformation of Tensile Deformation and Bending Deformation)

As a method for applying the combined deformation of the tensile deformation and the bending deformation to the end surface 10A of the test piece, a method may be acceptable insofar as the tensile stress given to the test piece 1 can be varied by a bead or a mechanism of holding and pressing the raw material 1 and the bending radius R of a die, a jig, or the like bending the raw material 1 and the presence or absence of a split in the end surface 10A can be confirmed. For simplicity, a method for applying various kinds of combined deformations by varying the bending radius R of the punch, the cushion pressure, and the presence or absence of the bead by the use of a hat-shaped draw forming die is preferable.

The combined deformation of the tensile deformation and the bending deformation occurs in pressing by draw forming, for example.

(Method for Evaluating Crack Due to Bending)

A tension immediately before the generation of a split and the strain gradient of the surface of the raw material 1 at the position where the split is generated by the above-described method are determined.

Specifically, the tension and the strain gradient are preferably determined on the boundary between the outside surface and the sheared end surface 10A of the raw material 1 to be bent. This is because the generation of a split is likely to occur in the boundary.

As a method for determining the tension and the strain gradient, known techniques may be used. As a method for determining the tension and the strain gradient, an experimental method for attaching a minute mark to the surface of the raw material 1, and then determining a strain from the deformation of the mark, a method for predicting a strain by forming simulation according to a finite element method, and the like are mentioned, for example, but the method is not limited thereto and known methods may be applied. Thus, the surface strain distribution is determined, and then the strain gradient is calculated from the determined surface strain distribution.

The shape of the mark may be a shape enabling the measurement of a strain after forming, such as a circle pattern, a dot pattern, a grid pattern, and a concentric circle pattern. As a marking method, electrolytic etching, photo-etching, transfer by ink (stamp printing), and the like are mentioned and any method may be used. However, marking is not preferable because the generation of a split is induced. In the case of the forming simulation, there is no necessity of reproducing shearing and a model reproducing the shape of an end portion of the sheared raw material 1 or a model in which the shape of an end portion is simply straightened may be used.

When a forming simulation according to a finite element method using a three-dimensional solid element is used, the tension can be accurately calculated.

The strain gradient is preferably calculated near a portion where the generation of a split is estimated. A smaller calculation range of the strain gradient in the sheet thickness direction X is better. The calculation range is preferably 90% or less and more preferably 50% or less of the sheet thickness of the raw material 1. This is because a split generated at an early stage is minute, and therefore, when the calculation is performed in the same minute range as the range where the split is evaluated, the accuracy is good. The calculation range of the strain gradient in the bending ridge line direction Y is preferably 10 mm or less and more preferably 5 mm or less. This is because warpage occurring in the end surface 10A of the raw material 1 in the bending deformation falls within the range above and the deformation of the warpage is considered.

(Evaluation of Deformation Limit)

Next, an example of a deformation limit evaluation method for the sheared surface 10A of the metal sheet 1 using the index value described above is described.

As described above, three or more sets of data containing a set of acquired values (tension, index value) of a tension immediately before the generation of a split in the sheared surface 10A and an index value in the same place in deformation including the bending immediately before the generation of the split are acquired in the same steel type while varying the deformation conditions of the simple bending deformation and the combined deformation of the tensile deformation and the bending deformation. Although the tension to be used may be one immediately after the generation of the split, the tension to be used may be one in a state at the earliest possible stage of the split. However, for the calculation of the tension, the tension in a state where the generation of the split is as small as possible is preferable, and therefore the tension in a state immediately before the generation of the split is adopted. In order to give allowance to the evaluation, the acquired values may be acquired in a state prior to immediately before the generation of the split.

Figure 3:
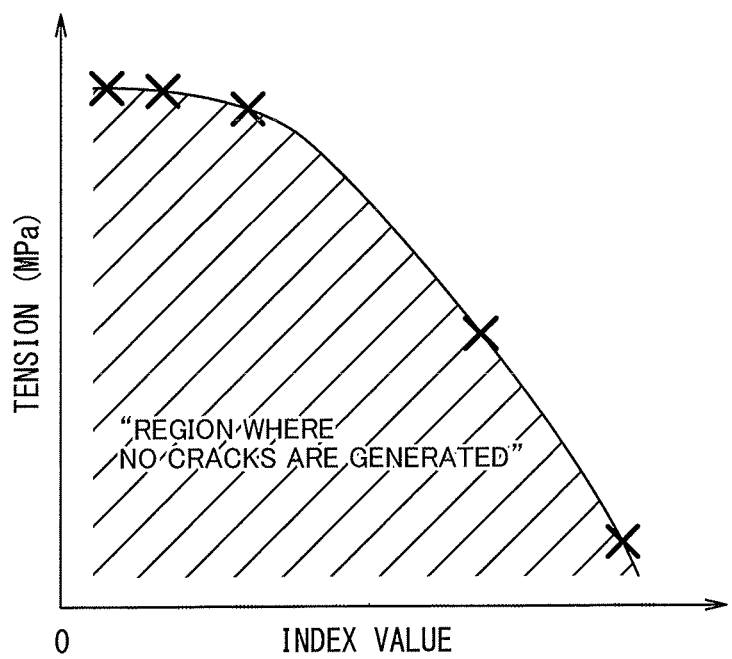
FIG. 3 is a view illustrating an example of a deformation limit line and a region where no cracks are generated in an end surface, which is found from the relationship between a tension and an index value.

Then, a curve passing through two or more of the acquired values acquired above is set as the deformation limit line as illustrated in FIG. 3. FIG. 3 illustrates a case of using five acquired values. Although a larger number of acquired values are preferable, the deformation limit line can be set when three or more acquired values are acquired.

The limit of the deformation in the sheared surface 10A in the bending deformation is evaluated based on the determined deformation limit line. The deformation limit line may be converted into a function expression. The deformation limit line is approximate to a quadratic curve or the like, for example.

For example, a region below the deformation limit line is set as a region where no cracks are generated in the end surface.

A press-formed article may be determined in such a manner that the bent shape of the end surface 10A in a bent and deformed portion in the formation into a product shape by press forming falls within the range equal to or less than the deformation limit line. Alternatively, the shape of a press die may be determined or a pressing process may be selected in such a manner that the bent shape falls within the range less than the deformation limit line in the end surface 10A in the bent and deformed portion in the formation into a product shape by press forming.

(Prediction of Crack)

The relationship between the tension generated in the end surface of the bent portion and the index value is determined beforehand as described above. Based on the relationship, it is predicted whether a crack is generated based on whether it is located in "Region where no cracks are generated" of FIG. 3.

Then, the design of a press die to be used in press forming is changed in such a manner that the generation of a crack in the metal sheet end surface 10A is suppressed to the position where the generation of a crack is predicted (evaluated).

Advantageous Effects

As described above, according to this embodiment, it can be accurately evaluated whether a crack from the end surface 10A is generated in deforming the target raw material 1 after shearing.

This evaluation method is utilizable also as a method for predicting the generation of a crack. For example, it can be accurately predicted whether the shape of a die to be used in press forming various parts, such as panel parts and structural/skeleton parts of automobiles, is appropriate. Moreover, this embodiment can reduce the defective rate of press-formed articles because the press forming can be stably performed and can contribute also to a reduction in a manufacturing period of a press die.

The raw material 1 having high strength generally has low ductility; and therefore a crack is likely to be generated by deforming the sheared surface 10A of the raw material 1. Therefore, aspects of the present invention are effective for the raw material 1 having higher strength. Specifically, the raw material 1 having tensile strength of 590 MPa or more is preferably targeted and the raw material 1 having tensile strength of 980 MPa or more is more preferable. Moreover, when targeted to the raw material 1 to be subjected to mass-production as in press forming as the type of the raw material 1, the cost is excellent. The metal sheet 1, particularly a steel sheet, is preferably targeted.

EXAMPLES

Next, Examples based on the present invention are described.

Aspects of the present invention were verified for three kinds of raw materials A, B, and C illustrated in Table 1. Shearing was performed to each raw material 1, whereby rectangle-shaped test pieces were produced.

For the shearing, a 10×20 mm rectangular punch and a 10.3×20.3 mm rectangular die were used (not illustrated). The clearance of the die was varied depending on the sheet thickness of each raw material 1 and was 15% of the sheet thickness in the raw material A, 10.7% of the sheet thickness in the raw material B, and 8.3% of the sheet thickness in the raw material C.

TABLE 1

| Material | Yield strength [MPa] | Tensile strength [MPa] | Total elongation [%] | Local elongation [%] | Sheet thickness [mm] |
| --- | --- | --- | --- | --- | --- |
| A | 924 | 1236 | 12.4 | 6.0 | 1.0 |
| B | 780 | 994 | 13.2 | 6.1 | 1.4 |
| C | 1183 | 1493 | 8.1 | 4.5 | 1.8 |

Two patterns of bending of simple bending deformation and combined deformation of tensile deformation and bending deformation were carried out to the test pieces, and then the relationship between a tension and a strain gradient in each bending pattern was determined. The relationship of a tension and a strain gradient for the simple tensile deformation was also determined.

Figure 4A:
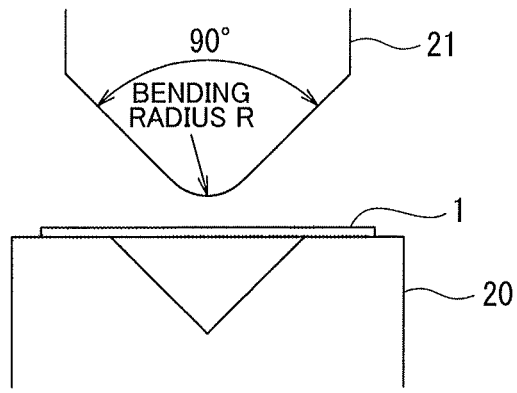
Figure 4B:
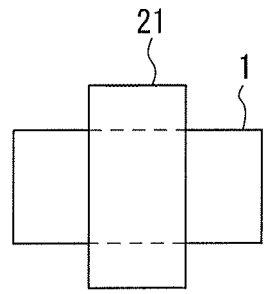

In the simple bending deformation, the bending was applied to the end surface 10A of the test piece 1 with a V-bending die having an apex angle of 90° illustrated in FIGS. 4A and 4B. The test piece was disposed so that the sagging side of a sheared portion contacted a bent R portion at the top of the punch 21. Then, a deformation test was carried out while varying the bending radius R of the tip of the punch 21 with a 0.5 mm pitch, and then the minimum bending radius such that no splits are generated in the end surface 10A of the test piece was determined. The reference numeral 20 designates a die.

Thereafter, a tension and a strain gradient in the end surface 10A when bent with the minimum bending radius were calculated by a forming simulation.

The calculation range of the strain gradient in the sheet thickness direction X was set to 50% of the sheet thickness of each raw material 1 and the calculation range of the strain gradient in the bending ridge line direction Y was set to 5 mm.

Figure 5A:
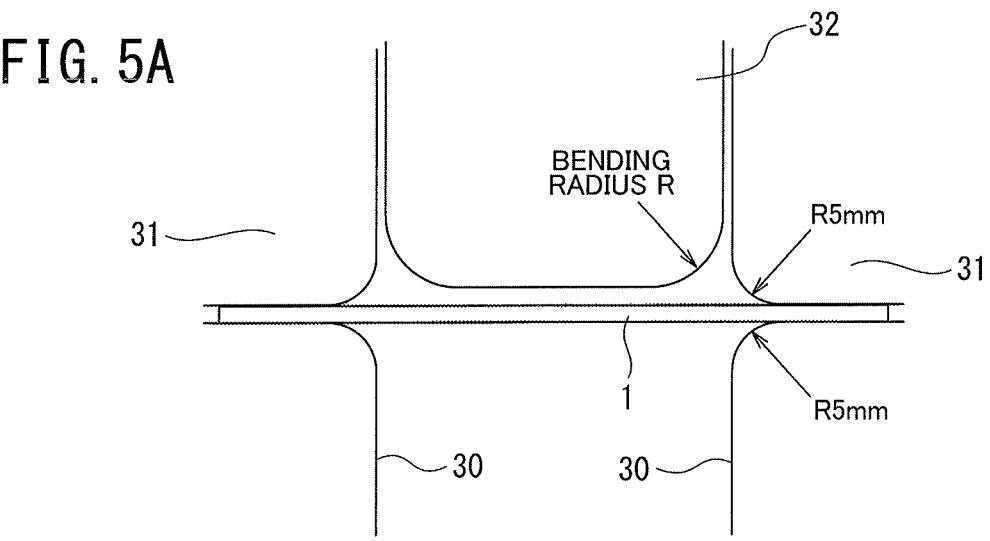
Figure 5B:
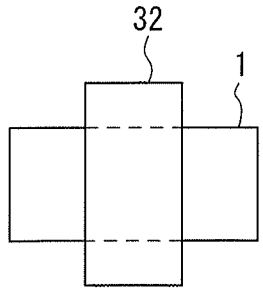

The combined deformation of the tensile deformation and the bending deformation was applied to the end surface 10A of the raw material 1 by a hat-shaped draw forming die illustrated in FIGS. 5A and 5B. The test piece 1 was disposed so that the sagging side of the sheared portion of the test piece 1 contacted the bent R portion of the punch 32. The reference numeral 30 designates a die. The reference numeral 31 designates a blank holder plate.

A test was performed while setting the bending radius R of a shoulder portion of a punch 32 to two kinds of radii of 5 mm and 10 mm and varying the blank holder force with a 2.5 ton pitch, and then the minimum blank holder force such that no splits are generated in the end surface 10A of the test piece with each bending radius was determined. Thereafter, a tension and a strain gradient of the end surface 10A when the combined deformation was applied under the same conditions by a forming simulation were calculated. The calculation ranges of the strain gradient in the sheet thickness direction X and the strain gradient in the bending ridge line direction Y are the same as those in the case of the bending deformation above.

A tensile test was also performed to the test piece, whereby the minimum tensile force such that no splits are generated in the end surface 10A of the test piece was determined. Thereafter, a tension and a strain gradient of the end surface 10A when the tensile deformation was applied under the same conditions were calculated by a forming simulation. In this case, the tension and various kinds of strain gradients in the end surface 10A were calculated using strain gradients in directions orthogonal to the tensile direction from the end surface 10A and the sheet thickness direction as the strain gradient in the bending ridge line direction Y.

Then, plural data containing a set of the tension and the index value calculated from the various kinds of strain gradients determined as described above were acquired.

Example 1

Figure 6:
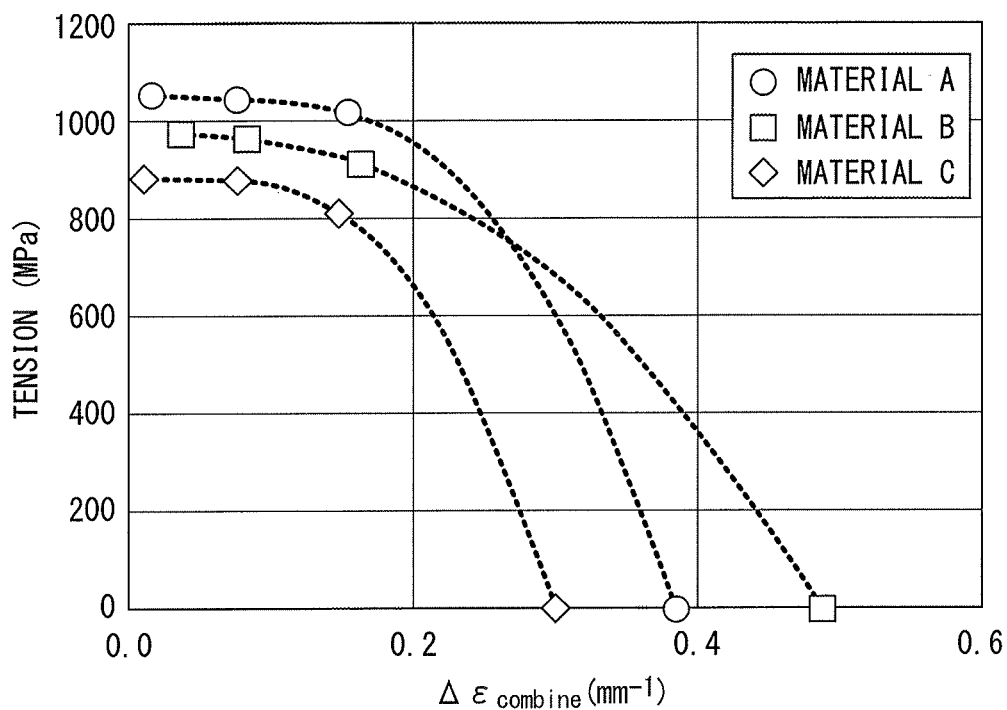
FIG. 6 is a view illustrating the relationship between a tension and an index value obtained from a root mean square of two strain gradients.

Example 1 is a result of calculating, as a root mean square value, Δεcombine as an index value based on Expression (2) according to this embodiment, and then rearranging the relationship between a tension and an evaluation value. FIG. 6 illustrates the rearranged result. As the calculation of the tension, the tension was calculated from a tensile stress generated in a finite element located in the center in the sheet thickness of a bent and deformed portion by a forming simulation.

Example 2

Figure 7:
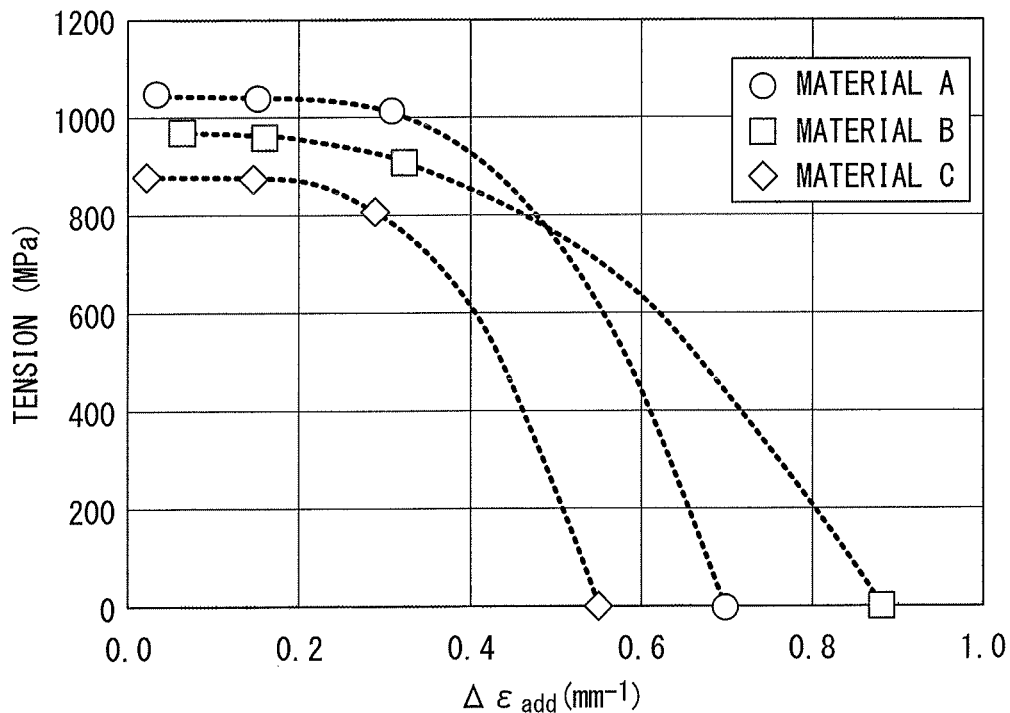
FIG. 7 is a view illustrating the relationship between a tension and an index value obtained from a sum of two strain gradients.

Example 2 is a result of calculating, as a sum of two strain gradients, Δεcombine as an index value based on Expression (4) according to this embodiment, and then rearranging the relationship between a tension and an evaluation value. FIG. 7 illustrates the rearranged result. As the calculation of the tension, the tension was calculated from an average value of stresses generated in finite elements distributed in the sheet thickness direction of a bent and deformed portion by a forming simulation.

(Verifications)
<Verification 1>

Figure 8:
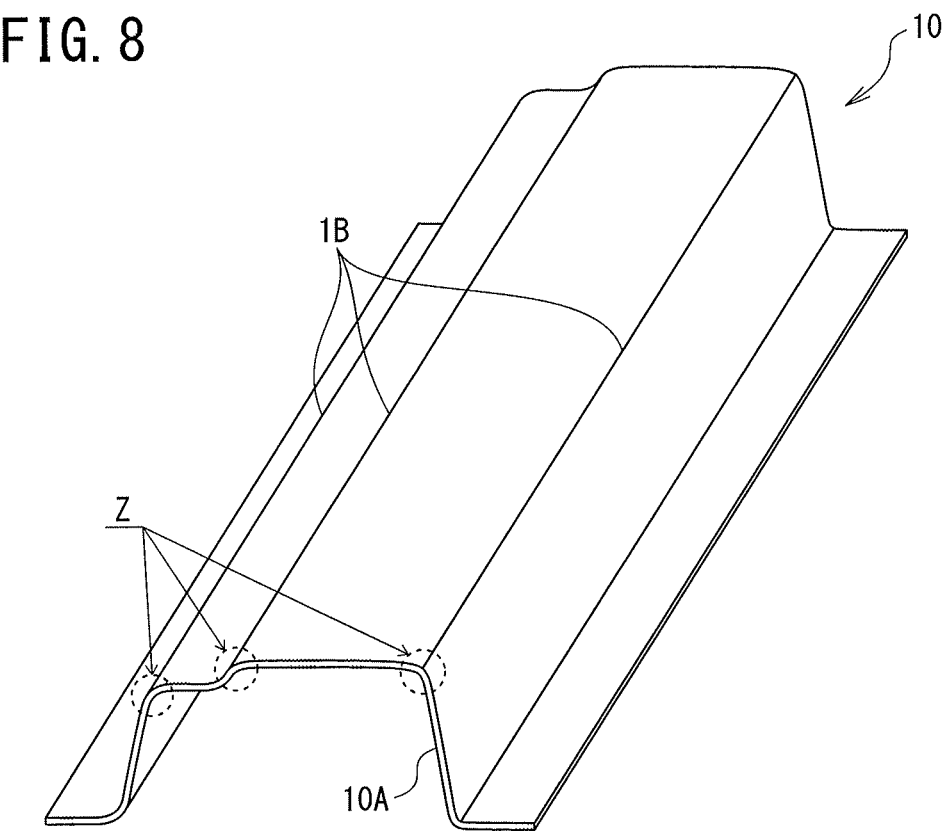
FIG. 8 is a view illustrating the product shape by bending forming in Examples.

A steel sheet containing a raw material A among three kinds of raw materials illustrated in Table 1 is deformed by bending by pressing the steel sheet with a die containing an upper die and a lower die to be deformed into a product shape illustrated in FIG. 8. This was variously carried out while changing the conditions of a bending R of the die.

Then, the positions illustrated by the reference numeral Z of FIG. 8 were set as evaluation positions, and then bending conditions when cracks were generated at each evaluation position Z and when no cracks were generated at each evaluation position Z were acquired.

Then, separately from the press forming, a three-dimensional press forming simulation was performed for cases where forming was performed under the processing conditions above using a finite element method, and then evaluation data containing a set of a tension along a sheared surface at the evaluation position (Z position) and an index value determined by Expression (2) above when press forming was performed under each condition were acquired.

When it was confirmed whether the plural evaluation data were located above or below the deformation limit line (see FIG. 6) determined in Example 1. Then, it was confirmed that the evaluation data when cracks were generated were all located above the deformation limit line and the evaluation data when no cracks were all generated were located below the deformation limit line.

<Verification 2>

Figure 9:
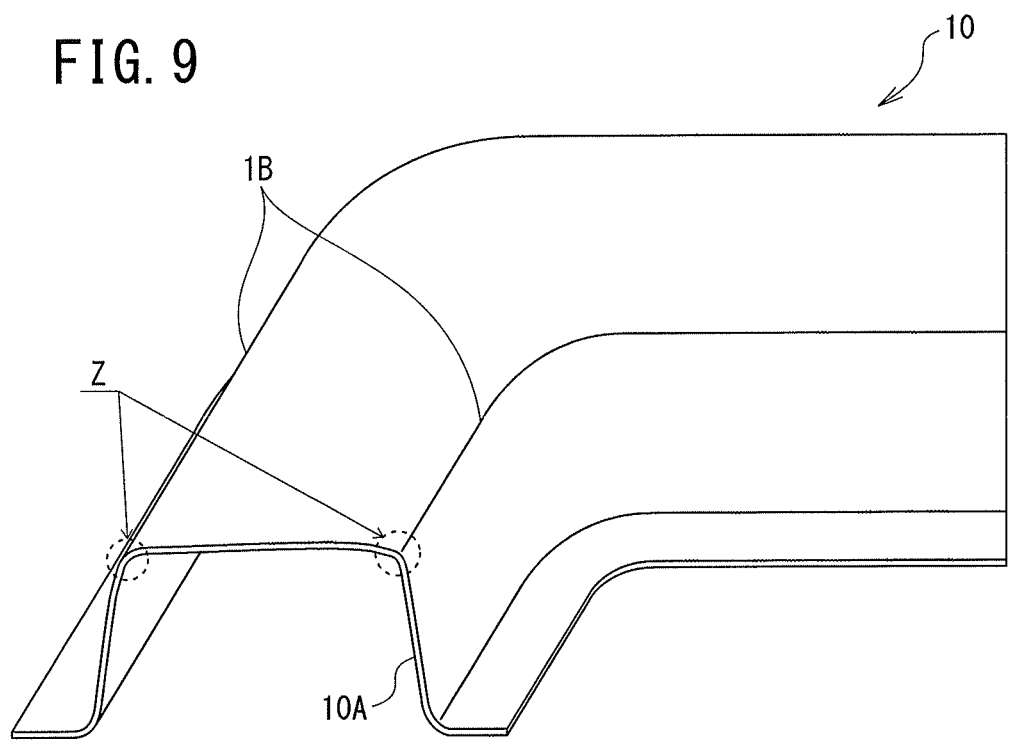
FIG. 9 is a view illustrating the product shape formed by deformation in which tensile deformation and bending formation are combined in Examples.

Similarly, the product shape after deformation was set to the shape illustrated in FIG. 9, and then the same verification as the verification 1 was performed. Herein, processing of a steel sheet into the shape illustrated in FIG. 9 was performed by draw forming. In press forming by the draw forming, deformation in which bending deformation and tensile deformation were combined occurred at a bending and deformation position.

Also in this case, it was confirmed that the evaluation data when cracks were generated were all located above the deformation limit line and the evaluation data when no cracks were all generated were located below the deformation limit line.

<Verification 3>

Moreover, with respect to the two verifications of Verification 1 and Verification 2 described above, a case where an index value was determined by Expression (4) above and the deformation limit line determined according to Example 2 (FIG. 7) was used was also verified. Also in this case, it was confirmed that the evaluation data when cracks were generated were all located above the deformation limit line and the evaluation data when no cracks were all generated were located below the deformation limit line.

<Verification 4>

Furthermore, raw materials of steel sheets were changed to the raw materials B and C, and then the same verification as above was also carried out. Also in this case, it was confirmed that the evaluation data when cracks were generated were all located above the deformation limit line and the evaluation data when no cracks were all generated were located below the deformation limit line regardless of which of Example 1 and Example 2 was used.

Thus, it was found that the deformation limit on the sheared surface when the pressing including bending was performed based on aspects of the present invention can be accurately evaluated.

Moreover, it was found that the method based on aspects of the present invention enables the evaluation of the deformation limit of simple bending deformation and the deformation limit of deformation in which bending deformation and tensile deformation are combined with one evaluation criteria.

Herein, for comparison, when a deformation limit line was determined, and then evaluated and verified in the same manner as in Verification 1 and Verification 2 using a strain gradient along the end surface as an index value, some evaluation data when cracks were generated were located below the deformation limit line.

As described above, the entire contents of Japanese Patent Application Publication No. 2017-160055 (filed Aug. 23, 2017) to which this application claims priority form part of this disclosure by reference.

Although the description is given referring to a limited number of embodiments herein, the scope of the present invention is not limited thereto. It is obvious for those skilled in the art to alter and modify the embodiments based on the disclosure above.

REFERENCE SIGNS LIST 1 raw material (metal sheet)
10A sheared surface (end surface)
X sheet thickness direction
Y ridge line direction

The invention claimed is:

1. A deformation limit evaluation method comprising:
evaluating the deformation limit on a sheared surface of a sheared metal sheet when the sheared metal sheet is formed by press forming including bending, and
performing press forming based on the evaluation of the deformation limit on the sheared surface to reduce defective rate, wherein
the deformation limit on the sheared surface is evaluated based on a relationship between an index value determined from two surface strain distribution gradients of a surface strain distribution gradient in a sheet thickness direction in the sheared surface and a surface strain distribution gradient in a bending ridge line direction by the bending at an evaluation position among distributions of stains generated near a boundary between a bending outside surface and the sheared surface of the metal sheet to be bent and a tension generated in the sheared surface, wherein the index value is a root mean square of the sum of the two strain distribution gradients.

2. The deformation limit evaluation method according to claim 1, comprising:
calculating the tension by a forming simulation of the bending; and
setting the tension as a tensile stress generated in a finite element along a center in the sheet thickness in a bent portion.

3. The deformation limit evaluation method according to claim 1, comprising:
calculating the tension by a forming simulation of the bending; and
setting the tension as an average value of tensions of finite elements distributed in the sheet thickness direction in a bent portion.

4. The deformation limit evaluation method according to claim 1, comprising:
calculating the surface strains in the sheet thickness direction and in the bending ridge line direction for determining the two surface strain distributions by the forming simulation of the bending.

5. The deformation limit evaluation method according to claim 1, wherein
the evaluation position is a position where generation of a split is estimated when an end surface is deformed by target bending.

6. The deformation limit evaluation method according to claim 2, comprising:
calculating the surface strains in the sheet thickness direction and in the bending ridge line direction for determining the two surface strain distributions by the forming simulation of the bending.

7. The deformation limit evaluation method according to claim 3, comprising:
calculating the surface strains in the sheet thickness direction and in the bending ridge line direction for determining the two surface strain distributions by the forming simulation of the bending.

8. A press die designing method comprising:
designing a shape of a press die suppressing generation of a crack in a metal sheet end surface using the deformation limit evaluation method according to claim 1.

9. A crack prediction method comprising:
predicting presence or absence of a crack when a sheared metal sheet is formed by press forming including bending, and
performing press forming based on the predicted presence of absence of the crack to reduce defective rate, wherein
a relationship between an index value having, as variables, two surface strain distribution gradients of a surface strain distribution gradient in a sheet thickness direction in a sheared surface and a surface strain distribution gradient in a bending ridge line direction by the bending among distributions of stains generated near a boundary between a bending outside surface and the sheared surface of the metal sheet to be bent and a tension generated in the sheared surface is determined beforehand, wherein the index value is a root mean square of the sum of the two strain distribution gradients; and
the crack in the sheared surface is predicted from the relationship and the index value determined from the two surface strain distribution gradients at an evaluation position.

10. A press die designing method comprising:
designing a shape of a press die suppressing generation of a crack in a metal sheet end surface using the crack prediction method according to claim 9.

* * * * *